S. I. FEKETE.
BRAKE LEVER RATCHET MECHANISM.
APPLICATION FILED JULY 25, 1918.

1,294,783.

Patented Feb. 18, 1919.

INVENTOR
Stephen I. Fekete
by Marchant, Calver, Copeland &Dog.
Attys.

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

BRAKE-LEVER RATCHET MECHANISM.

1,294,783.  Specification of Letters Patent.  Patented Feb. 18, 1919.

Application filed July 25, 1918. Serial No. 246,638.

*To all whom it may concern:*

Be it known that I, STEPHEN I. FEKETE, a subject of the King of Hungary, residing at Detroit, county of Wayne, State of Michigan, have invented a certain new and useful Improvement in Brake-Lever Ratchet Mechanism, of which the following is a specification, reference being had therein to the accompanying drawings.

My invention relates to an improved brake lever ratchet mechanism for use particularly on the brake levers of automobiles. The object of the invention is to provide a mechanism of this character which shall be capable of finer adjustment and yet have increased durability. While it is intended for use primarily on the brake levers of automobiles, it is applicable to levers for many other purposes, and the invention is not limited to the particular use mentioned.

Heretofore it has been customary to use a brake lever having a single pawl which coöperates with the notches in a curved segment. The notches have ordinarily been made quite large because it has been found by experience that, if the notches are fine, the points of the teeth of the segment and the point of the pawl wear in a short time so that the brake is likely to release itself when subjected to vibration or a slight blow. This condition is dangerous and objectionable for many reasons. On the other hand if the notches of the segment are made large enough to provide against these dangers they do not provide for the gradual wear of the parts operated by the lever. It is frequently found that where large notches are employed, the brakes will not hold firmly when the pawl is in one notch and yet it will be impossible to put the pawl into the next notch without exerting so much force on the lever as to strain or do injury to the various parts.

The brake ratchet mechanism embodying my invention includes a single sector having a succession of large notches which, therefore, hold the brake firmly and do not wear seriously and a plurality of pawls of different lengths operating alternately to hold the brake lever in successive positions corresponding to half notches of the segment.

The mechanism embodying my invention is not only more durable and safer than the mechanism heretofore commonly employed but is quite as inexpensive to construct owing to the fact that the segment with coarse teeth and large notches may be made more quickly and cheaply.

The invention will be fully understood from the following description when taken in connection with the accompanying drawings and the novel features thereof will be pointed out and clearly defined in the claims at the close of this specification.

In the drawings, Figure 1 is a side elevation of the brake lever and segment embodying my invention. In this figure the pawl 18 is in engagement with one of the notches of the segment.

Figure 1:
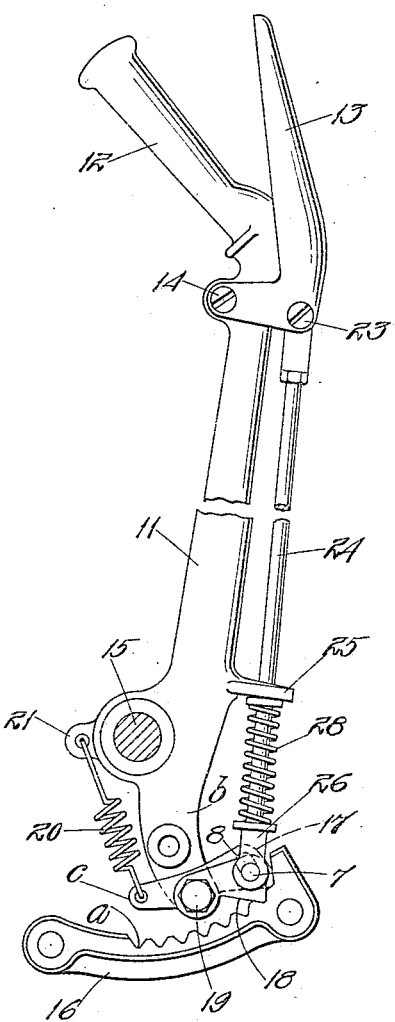
Figure 2:
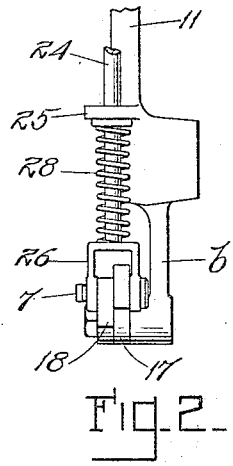
Fig. 2 is a rear elevation of the lower end of the brake lever and attached parts.

Referring now to the drawings, at 11 is shown a lever having a handle 12, at 13 is a latch pivoted at 14 to the lever. The brake lever 11 is pivoted at 15 to a rod or other pivot through which the brake is operated by suitable connections not shown. The segment is designated 16 and is provided on its upper surfaces with large notches *a*. In the form shown in the drawings, the brake lever 11 projects as shown at *b* below the rod 15 and two pawls 17 and 18 are pivoted at 19 to the lower end of the extension *b*.

The pawl 17 is longer than the pawl 18, that is, the distance from the center of the pivot 19 to the point of engagement between the pawl and the segment 16 is greater than the corresponding distance of the pawl 18. The pawl 17 has a tail *c* to which is secured one end of a spring 20 the other end being secured to a lug 21 on the lever 11.

The latch 13 is connected pivotally as shown at 23 to a rod 24 extending through a guide 25 and terminating at its lower end in a fork 26. Surrounding the rod 24 is a spring 28 one end of which bears against the under side of the guide 25 and the other end of which rests on an enlargement at the lower end of said rod. The fork 26 carries a bolt 7 which passes through a hole in the pawl 18. The pawl 17 is provided with a slot 8 so that the fork 26 may travel a distance equal to the length of the slot before moving the pawl 17.

Figure 3:
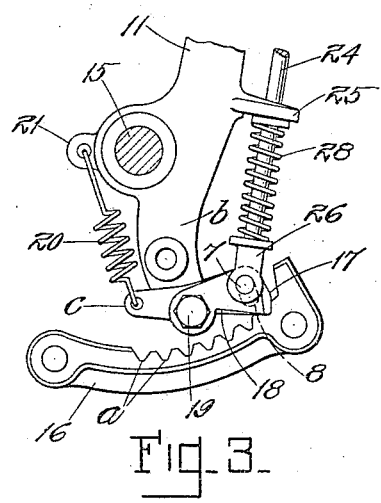
Fig. 3 is a view similar to Fig. 1, the brake lever being in a position to show the pawl 17 in engagement with one of the notches of the segment.

Since the pawls 17 and 18 are of different lengths the difference in length being equal to about one-half the distance of the tooth of the segment, only one pawl will engage with a tooth at one time. Thus in Fig. 1 the pawl 18 is shown in engagement with one of the notches of the segment but the pawl 17 rides on the top of the adjacent tooth. In Fig. 3 the pawl 17 is shown in engagement with the notch while the pawl 18 rides on the top of the tooth. The pawl 17 is held in engagement with the segment by means of the spring 20 and the pawl 18 is held in engagement by means of the spring 28 which surrounds the rod 24.

The mechanism just described will hold the brake lever 11 in successive positions corresponding to half notches of the segment 3 and since the notches may be made deep and the teeth strong a better and safer device is produced.

What I claim is:

1. In combination, a brake lever, a notched segment, two pawls pivotally connected with said brake lever and both engaging said segment simultaneously at different points, a half-tooth apart, a latch pivoted to the brake lever, a rod pivotally connected with said latch and with both of said pawls, springs which normally hold both pawls in engagement with said segment at different points, and means whereby the rod is required to move through a greater distance to disengage one pawl than to disengage the other pawl.

2. In combination, a brake lever, a notched segment, two pawls of unequal length pivotally connected with said brake lever and both engaging said segment, the distance from the center of the pivot of the pawl to the point of its engagement with the segment being greater in case of one pawl than in case of the other pawl, a latch pivoted to the brake lever, a rod pivotally connected with said latch and with both of said pawls, springs which normally hold both pawls in engagement with said segment at different points, and means whereby the rod is required to move through a greater distance to disengage one pawl than to disengage the other pawl.

3. In combination, a brake lever, a notched segment, two pawls of unequal length pivotally connected with said brake lever and both engaging said segment, the distance from the center of the pivot of the pawl to the point of its engagement with the segment being greater in case of one pawl than in case of the other pawl, a latch pivoted to the brake lever, a rod pivotally connected with said latch and with both of said pawls, springs which normally hold both pawls in engagement with said segment at different points, the pivot connection between one of said pawls and said rod being through an elongated slot whereby the rod has to move through a sufficient distance to cause the pivot connection to travel the length of the slot before one of the pawls is moved.

4. In combination, a brake lever, a notched segment, a pair of pawls of different lengths adapted to engage the notches in said segment alternately, one of said pawls being provided with a tail, a spring attached to the tail and to the brake lever, a latch, a fork connection engaging said pawls, means connecting the latch and the connection and a spring acting on said fork connection.

5. In combination, a brake lever, a notched segment, a pair of pawls pivotally mounted on the brake lever, one of said pawls being longer than the other by an amount equal to about one-half of the distance between successive notches of the said segment, one of said pawls being provided with a tail and a slot, the other of said pawls being provided with a pivotal member extending through said slot, a latch on the said lever, a connection from the said latch to the said pivotal connection, a spring tending to hold the said pivotal connection toward the segment and a second spring acting on the said tail.

6. In combination, a brake lever fulcrumed intermediate its ends, a notched segment, two pawls of unequal length both pivotally connected with one arm of said brake lever, the distance from the center of the pivot of the pawl to the point of its engagement with the segment being greater in case of one pawl than in case of the other pawl, a bell crank shaped latch, one arm of which is pivoted to the opposite arm of the brake lever from that to which the pawls are pivoted, a rod pivotally connected at one end to said latch and pivotally connected at its other end with both of said pawls, and a separate spring for each of said pawls to normally hold said pawls in engagement with said segment.

In testimony whereof I affix my signature.

STEPHEN I. FEKETE.

Copies of this patent may be obtained for five cents each, by addressing the "Commissioner of Patents, Washington, D. C."